United States Patent
Heizmann et al.

(10) Patent No.: US 12,063,619 B2
(45) Date of Patent: Aug. 13, 2024

(54) REGIONAL PARAMETERIZATION FOR LORAWAN

(71) Applicant: VEGA GRIESHABER KG, Wolfach (DE)

(72) Inventors: Patrick Heizmann, Oberwolfach (DE); Florian Krämer, Mühlenbach (DE); Stefan Allgaier, Oberwolfach (DE)

(73) Assignee: VEGA GRIESHABER KG, Wolfach (DE)

( * ) Notice: Subject to any disclaimer, the term of this patent is extended or adjusted under 35 U.S.C. 154(b) by 331 days.

(21) Appl. No.: 17/522,554

(22) Filed: Nov. 9, 2021

(65) Prior Publication Data

US 2022/0159608 A1    May 19, 2022

(30) Foreign Application Priority Data

Nov. 19, 2020   (DE) ................ 10 2020 130 550.8

(51) Int. Cl.
*H04W 64/00*    (2009.01)
(52) U.S. Cl.
CPC ................................ *H04W 64/00* (2013.01)

(58) Field of Classification Search
None
See application file for complete search history.

(56) References Cited

U.S. PATENT DOCUMENTS

| 2008/0081676 A1* | 4/2008 | Chakraborty ...... G05B 19/4185 455/574 |
| 2020/0132787 A1* | 4/2020 | Heeder .................. G01R 33/10 |

OTHER PUBLICATIONS

GPTO first office action for related German application 102020130550.8, issued on Sep. 17, 2021, Nov. 30, 2023.

* cited by examiner

*Primary Examiner* — Frantz Bataille
(74) *Attorney, Agent, or Firm* — William Gray Mitchell

(57) ABSTRACT

A field device having at least one radio communication means with at least two different operating modes, wherein the different operating modes can be activated as a function of the operating location of the field device, wherein the field device has at least one position determination means and is configured in order to determine an operating mode of the radio communication means from the position data and to make a selection according to predetermined conditions.

14 Claims, 2 Drawing Sheets

REGIONAL PARAMETERIZATION FOR LORAWAN

CROSS REFERENCE TO RELATED APPLICATIONS

This patent application claims priority to German Patent Application 102020130550.8, filed on Nov. 19, 2020.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention comprises a field device, expansion module and method for operation.

Background of the Invention

Known field devices of automation technology, in particular process automation or factory and/or logistics automation, are equipped and operated with various radio technologies.

The term automation technology is understood to mean a sub-area of technology that includes all measures for the operation of machines and systems without the involvement of humans. One goal of the associated process automation is to automate the interplay of individual components of a plant in the chemical, food, pharmaceutical, crude oil, paper, cement, shipping, and mining sectors. For this purpose, a variety of sensors can be used, which are adapted to the specific requirements of the process industry, in particular, such as mechanical stability, insensitivity to contamination, extreme temperatures, and extreme pressures. Measurement values of these sensors are usually transmitted to a control room, in which process parameters such as fill level, limit level, flow, pressure, or density can be monitored and settings for the entire plant system can be changed manually or automatically.

A sub-area of automation technology relates to logistics automation. With the assistance of distance and angle sensors, processes within a building or within a single logistics system are automated in the area of logistics automation. Typical applications include, for example, systems for logistics automation in the area of baggage and freight handling at airports, in the area of traffic monitoring (toll systems), in trade, package distribution, or also in the area of building security (access control). The examples listed above have in common that a presence detection in combination with an exact measurement of the size and position of an object is required on the respective application side.

For this purpose, sensors on the basis of optical measurement methods by means of lasers, LEDs, 2D cameras, or 3D cameras, which detect distances according to the time of flight (ToF) principle, can be used.

Another area of automation technology concerns factory/manufacturing automation. Applications for this can be found in a wide variety of industries such as automotive manufacturing, food production, the pharmaceutical industry, or generally in the field of packaging. The goal of factory automation is to automate the production of goods by machines, production lines, and/or robots, i.e. allowing them to run without the involvement of humans. The sensors used here, and the specific requirements with regard to measurement accuracy in the detection of the position and size of an object, are comparable to those in the previous example of logistics automation. Therefore, sensors based upon optical measurement methods are usually also used on a large scale in the area of factory automation.

To date, in the area of logistics automation as well as in the areas of factory automation and safety technology, optical sensors have dominated. These are fast (fast filling processes at $>=10$ measurements/second) and cost-effective and can reliably determine the position and/or the distance to an object on the basis of the optical radiation that can be focused with relative ease, which is the basis of the measurement.

In process automation technology, field devices that serve to record and/or influence process variables are often used. Examples of such field devices are fill level gauges, limit level gauges, and pressure gauges with sensors that detect the corresponding process variables of fill level, limit level, or pressure. Often, such field devices are connected to superordinate units, e.g. guide systems or control units. These superordinate units serve the process control, process visualization, and/or process monitoring.

The term "field device" is used here to subsume various technical means that are directly related to a production process. "Field" refers to the area outside of control rooms. Field devices can thus in particular be actuators, sensors, data collectors (data loggers), and transducers.

Wired-operated automation devices, in particular, are widely used, which can be connected wirelessly to a portable control unit, for example a smartphone, as needed via a near field interface (Bluetooth, Zigbee, or others). In particular, this makes it possible to simplify processes during the commissioning or maintenance of the devices. In addition, there are a plurality of automation devices in the prior art that use a wireless interface for the continuous transmission of measured values or control signals to a second automation component. An important aspect of this is the use of radio technologies that can be operated with as little energy as possible with a simultaneous high range. On the basis of such technologies, it is possible to implement wireless communication systems in automation devices that can draw a limited amount of energy from their respective bus system.

On the basis of energy-saving radio communication technologies, autonomous systems that cover their energy requirements largely or completely from an energy storage unit integrated in the device, for example a battery, are now also possible. Such systems are characterized in that they are often used in mobile applications, for example in the form of sensors in logistics applications, and thus change their respective operating location at certain time intervals.

The present application further relates to autonomous measuring arrangements, in particular autonomous fill level or limit level sensors. The autonomous fill level or limit level sensors are preferably configured as radar sensors and, in order to ensure the autonomy of the sensors, have, in addition to a measuring sensor for the acquisition of measurement data, a transmission means for the preferably wireless transmission of recorded measurement data or measured values and a separate energy supply.

The transmission means can preferably be a radio module for a narrow band radio technology (LoRa, Sigfox, LTE-M, NB-IOT), which transfers the measurement data or measured values to a cloud, i.e. to a server in the World Wide Web. The energy supply is preferably designed as a battery or accumulator and can additionally comprise an energy harvesting module.

Typical application scenarios for such field devices include, in particular, inventory management or measuring tasks on mobile containers.

Known field devices of the aforementioned type have thus far made it possible to transmit measured values, so that a superordinate unit triggers a predetermined action based on the determined measured value. For example, based on the measured value of a fill level gauge, a feed can be closed or a drain can be opened if a limit value is exceeded.

Autonomous field devices are characterized by a particularly simple assembly without attachment of a communication or supply line and thus offer particularly flexible possibilities for arrangement, i.e. in particular their mounting in the process environment. An autonomous field device according to the present application preferably comprises at least one sensor for detecting a process variable as well as sensor electronics, a radio module, and an energy supply.

The measured values determined by these field devices are typically transferred to a cloud, i.e. to a server in the World Wide Web, using a narrow band radio technology (LoRa, Sigfox, NB-IOT). Typical application scenarios for such field devices include areas such as flood forecasting, inventory management, or other remotely distributed measurement tasks.

In addition, expansion modules designed primarily for wired automation devices exist and are used in specially designed expansion interfaces of the devices in order to expand them with wireless communication options. It can be provided that these expansion modules contain a plurality of wireless communication technologies.

Furthermore, it can be provided that such expansion modules are only operated temporarily, for example within the scope of an audit, in connection with one device, and then installed in another automation device. This also changes the operating location for such expansion modules, even when they are operated temporarily wired with an automation device, for example a sensor.

Wireless communication means for automation devices have been gaining importance for several years. In the first few years, appropriately equipped devices with sufficient energy supply were primarily used in order to transmit measured values via a GSM mobile radio connection. Newer approaches tend to pursue the goal of connecting sensors via a near field interface (e.g. Bluetooth) for simplified operation with a portable device, for example a smartphone. Completely new methods from the class of narrow-band radio technologies (e.g. LoRa, Sigfox, NB-IoT, CAT-M) have recently made it possible to transfer measured values over long distances to a base station with a minimum of energy, which makes it possible to use fully autonomously operated sensors.

In particular for LoRa, but also for other radio standards, there are country-specific specifications for the approval and operation of such radio interfaces, i.e. depending on the country in which the field device is operated with the respective radio communication means (hereinafter also referred to as "radio interface"), different specifications must be taken into account. Until now, relevant country information has been requested for permanently installed field devices during commissioning of the field device and stored in a memory of the field device according to user input. Subsequently, the field device is operated according to the information entered by the user.

On the one hand, this procedure has the disadvantage that it can lead to incorrect entries, whereas on the other hand, it is not compatible with the current development of technology for field devices, which as described above are increasingly being used autonomously and mobile.

It is therefore the problem of the present invention to provide a field device and an expansion module for a field device, which reduces incorrect entries and is also compatible with autonomous and mobile field devices. It is furthermore a problem of the present invention to specify a method for operating such a field device and such an expansion module as well as a computer program code implementing the method.

These problems are solved by a field device having the features of claim 1, an expansion module for a field device having the features of claim 7, a transportable container having the features of claim 8, a method having the features of claim 9, and a computer program code implementing the method according to claim 13.

BRIEF SUMMARY OF THE INVENTION

In a preferred embodiment, a field device (1) having at least one radio communication means (3) with at least two different operating modes, wherein the different operating modes can be activated as a function of the operating location of the field device (1), characterized in that the field device (1) has at least one position determination means (5), wherein the field device (1) is configured in order to determine an operating mode of the radio communication means (3) from the position data and to make a selection according to predetermined conditions.

In another preferred embodiment, the field device (1) as described herein, wherein the position determination means (5) is configured as a satellite-supported position determination means (5).

In another preferred embodiment, the field device (1) as described herein, wherein the position determination means (5) is designed in order to evaluate position data provided by a wireless network.

In another preferred embodiment, the field device (1) as described herein, wherein the operating mode comprises a channel selection and/or a used frequency band and/or a setting of a transmission power and/or a setting of a radio protocol.

In another preferred embodiment, the field device (1) as described herein, wherein the field device (1) is configured in order to detect a movement of the field device (1).

In another preferred embodiment, the field device (1) as described herein, wherein the field device (1) is configured as an autonomous field device (1).

In another preferred embodiment, an expansion module for a field device (1), wherein the expansion module has at least one radio communication means (3) with at least two different operating modes, wherein the different operating modes are dependent on an operating location of the field device (1), characterized in that the expansion module has at least one position determination means (5), wherein the expansion module is configured in order to determine an operating mode of the radio communication means (3) from the position data and to make a selection according to predetermined conditions.

In another preferred embodiment, a transportable container having a field device (1), wherein the field device (1) as described herein is configured as a field device (1) with an expansion module as described herein.

In another preferred embodiment, a method for operating a field device (1) as described herein:
  determining a position and/or a position signal indicating a position,
  determining an operating mode applicable to the position setting the operating mode,
  operating the radio communication means (3) in the set operating mode.

In another preferred embodiment, the method as described herein, wherein position signals of a satellite network are determined for the position determination.

In another preferred embodiment, the method as described herein, wherein information of available radio communication networks (3) is determined for the position determination.

In another preferred embodiment, the method as described herein, wherein a movement of the field device (1) is detected and a position determination is performed only upon switching on or activation after a detected movement, and otherwise the previously used operating mode of the radio communication means (3) is used further.

In another preferred embodiment, a computer program code, which, when executed by a processor, causes a field device (1) to carry out the method as described herein.

DETAILED DESCRIPTION OF THE INVENTION

Figure 1:
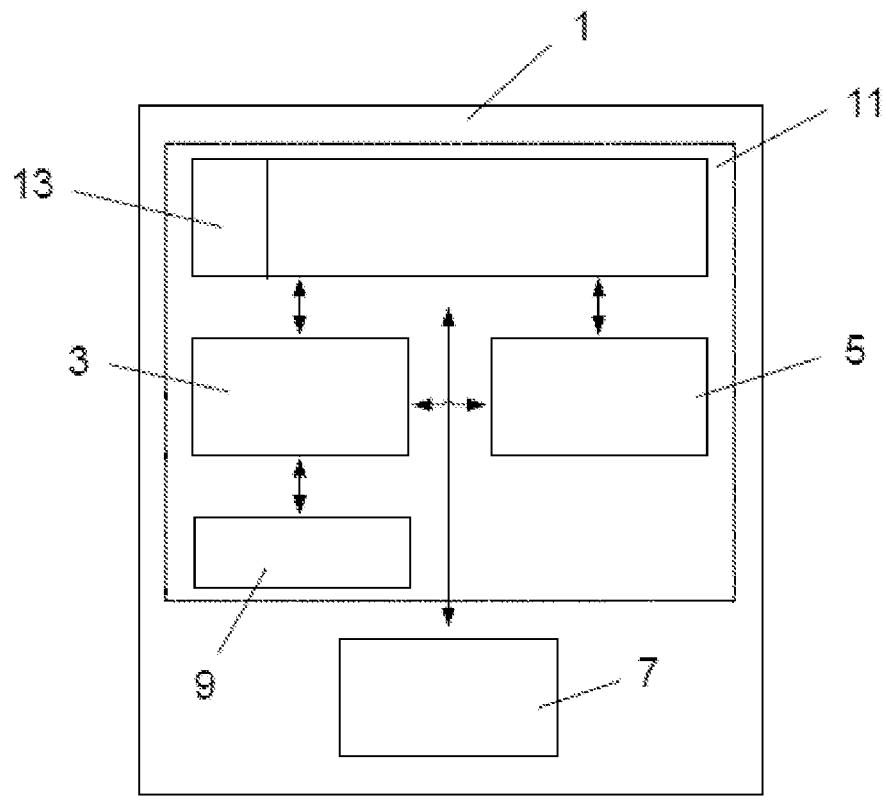
FIG. 1 is a schematic view of a field device according to the present application.

A field device according to the invention has at least one radio communication means with at least two different operating modes, wherein the different operating modes can be activated depending on a place of operation of the field device. The field device is characterized in that it comprises at least one position determination means, wherein the field device is configured in order to determine an operating mode of the radio communication means from position determination data determined by the position determination means and to select according to predetermined conditions.

It is thus possible to automatically set the operating mode of the radio communication means as a function of the position of the field device. For example, for LoRa, but also for other radio standards, a country-specific so-called Channel Plan, in which it is defined which channels (frequencies and bandwidths) a radio communication means must or may use, can be used automatically. For various radio standards, there are also country-specific requirements for the approval and operation of such radio communication means, i.e. depending on the country in which the field device is operated with the respective radio communication means, different requirements must be met.

With a position determination means according to the invention, it is possible to automatically switch these prerequisites and thus create a universally usable field device.

It is no longer necessary to produce and store a large number of different field devices, because a single, universally usable field device meets all requirements. At the same time, the local or regional specifications are implemented automatically, so that added value is created not only for the manufacturer but also for the operator of the field device. On the one hand, the customer does not need to pay attention to a certain country variant when ordering the field device and on the other hand cannot make any errors in this regard when commissioning the field device. Furthermore, it is possible that radio communication can be implemented in predetermined regions, e.g. border regions or a restricted area for a specific radio standard.

According to the present application, the operating mode of the radio communication means comprises preferably at least one channel selection and/or a used frequency band and/or a setting of a transmission power and/or a setting of a radio protocol and/or a selection of an antenna and/or a quantity of transmitted user data and/or the transmission of additional data, e.g. additional measured values or diagnostic data.

Local conditions and/or regulations can be taken into account by adjusting the operating mode accordingly. For example, when using WLAN, the channel selection as well as the maximum permitted transmission power can be adapted to the respective national regulations. For example, the maximum transmission power in 2.4 GHz band according to standard IEEE 802.11g and n is limited to 100 mW, while in the United States a maximum transmission power of 1 W is permissible. Similarly, the permissible or recommended channels differ regionally.

For radio communication equipment of the LoRa network, the frequencies are broken down into 10 different "Channel Plans," for example, AS923, EU868, EU433, US915.

Other regional parameters differ depending on the region, such as the number of channels, duty cycles, maximum payload, and transmission power. Different radio modules and/or antennas are required depending on the respective frequency band.

Parameters for Channel Plans EU 868 and US 915 are shown below as examples:

| Channel Plan | EU 868 | US 915 |
| --- | --- | --- |
| Channel Frequency | 867-86 MHz | 902-928 MHz |
| Number of Channels | 10 | 64 + 8 + 8 |
| Channel BW Up | 125/250 kHZ | 125/500 kHz |
| Channel BW Dn | 125 kHZ | 500 kHz |
| TX Power Dn | +14 dBm | +27 dBm |
| Tx Power Up | +14 dBm | +20 dBm typ (+30 dBm allowed) |
| Data rate | 250 bps-50 kbps | 980 bps-21.9 kpbs |

The Channel Plans shown by way of example differ, in addition to the frequency band (channel frequency) used, for example in the number of available channels (number of channels), the bandwidth of the channels (channel BW Up/Dn=bandwidth for sending/receiving), the transmission power (TX Power Dn/Up), and the available data rate (Data rate).

The field device is in particular a mobile field device, i.e. in particular a field device that is not installed or operated locally. Mobile field devices within the meaning of the present application are field devices that are either used mobile at different locations or field devices that are attached to mobile carriers, e.g. mobile containers. Mobile containers are, for example, so-called IBCs (Intermediate Bulk Containers) or other transportable containers such as truck-mounted silos and the like. Transportable within the meaning of the present application is considered to be by common means such as forklifts, trucks, and similar transportable containers.

The position determination means can, for example, be configured as a satellite-supported position determination means. As a rule, such an embodiment of the position determination means can determine an absolute geographical position worldwide and use it for the selection of the operating mode of the radio communication means. As an example, GPS, GLONASS, and GALILEO are named here as possible position determination means.

In addition or alternatively, the position determination means can be suitably configured in order to evaluate position data provided by a wireless network. Such data can be, for example, the availability and localization of WLAN signals in an individual location-dependent combination. These signals originate from commercial hotspots, company networks, or private home networks. The knowledge of the location of these networks (routers) thus permits the calculation of the location. In this way, a position determination can also take place at locations where satellite signals are not available, e.g. in buildings.

Suitable signals can be, for example, mobile radio, WLAN, LoRa, Sigfox, NB-IOT, or NFC signals, which are received via a radio communication unit of the fill level gauge, for example.

The position can be determined directly or indirectly. This means that a position determination takes place directly in the field device or indirectly via an available radio communication network and, for example, a service contacted via the latter. For an indirect position determination, the position signals indicating one position of the field device are transmitted to the service, which runs on a server on the internet, for example. This determines the position and transfers it back to the field device. In addition or alternatively, the service can determine the availability of radio communication networks and transmit them to the field device, so that the latter can select a possibly more suitable radio communication means for further communication.

In order to save energy for determining the position, the field device can be configured to detect a movement of the field device. In this way, it is possible to carry out a position determination only upon restarting the field device and after a detected movement, i.e. if the position of the field device has changed, otherwise the last selected operating mode is still used. This avoids unnecessary positional determinations and the associated energy consumption.

It is thus possible to determine whether the field device is stationary at a location or whether it is in motion. For this purpose, the field device can have one or more sensors that directly indicate a movement of the field device, such as an acoustic, optical, and/or radar-based Doppler sensor, an acceleration sensor, a vibration sensor, and/or a terrestrial magnetic field sensor.

The field device is preferably configured as an autonomous field device and can therefore be used particularly easily while mobile.

Autonomous field devices, in particular autonomous sensors, gain additional application possibilities through the use of one or more of the aforementioned radio standards. This product family of autonomous sensors, i.e. field devices, is characterized by a particularly simple installation without the need for a communication or supply cable. The measured values determined by these field devices are typically transferred to a cloud, i.e. to a server in the World Wide Web, using a narrow band radio technology (LoRa, Sigfox, NB-IOT). Typical application scenarios for such field devices include areas such as flood forecasting, monitoring of rain overflow basins, inventory management, measurement tasks on or in connection with mobile containers or other remotely distributed measurement tasks.

The present invention further relates to an expansion module for a field device, wherein the expansion module has at least one radio communication means with at least two different operating modes, wherein the different operating modes are dependent on an operating location of the field device, and is characterized in that the expansion module has at least one position determination means, wherein the expansion module is configured in order to determine an operating mode of the radio communication means from the position data and to make a selection according to predetermined conditions.

In this way, the advantages of the field device described above are also made available for existing devices. The existing devices can be equipped with a corresponding expansion module, and thus the functionality according to the invention can be retrofitted.

An expansion module according to the invention can advantageously be used, in particular, in the case of modularly designed field devices.

Modularly designed field devices are assembled from a modular field device concept. In a modular field device concept, a plurality of combinable sensors, housings, electronics units, and operating and/or display units can be selected, and a corresponding field device can be constructed. Such a modular field device concept is offered, for example, by the company Vega Grieshaber KG. As a rule, the following can be combined: a sensor, a corresponding electronic module providing a measured value processing and an interface to a control and, if necessary, a field bus used, as well as various display and/or operating units. The sensors, electronic modules, and display and/or operating units are adapted to one another and to various available housings.

The aforementioned expansion module is integrated into such a modular field device concept and thus opens up the possibility of equipping the field devices formed in this way, in particular also existing field devices, with the functionality described above.

A further aspect of the present invention relates to a transportable container having a field device designed according to the above description. Mobile containers can be equipped particularly well with mobile and preferably autonomous field devices.

In this context, it is an advantage that the autonomous field devices do not require connection lines and can often be operated with publicly available infrastructure. In particular, the above-mentioned narrow-band radio technologies are often publicly available on a large scale, so there are no additional costs for the operation and maintenance of a private infrastructure. Accordingly, mobile containers, e.g. so-called IBCs (Intermediate Bulk Containers) can already be equipped ex works with a mobile field device, in particular an autonomous fill level gauge, which must then only be integrated into the inventory management system of the respective user in order to monitor, for example, the position and fill level of the container.

In particular, in the case of autonomous field devices, it is advisable to integrate them directly into a container. For example, a corresponding field device with a radio communication unit can be integrated into a mobile container, e.g. an IBC (intermediate bulk container), e.g. injected into the plastic during the production of the IBC or otherwise integrated. Alternatively, the field device can be integrated into a cover of the IBC and can thus also be retrofitted with conventional IBCs.

A method according to the invention for operating a field device or a field device having an expansion module according to the above description has at least the following steps:
- determining a position and/or a position signal indicating a position,
- determining an operating mode applicable to the position setting the operating mode,
- operating the radio communication means in the set operating mode.

The method is preferably carried out after switching on or activating the field device. This ensures that when the field device is switched on for the first time, i.e. is put into operation for the first time, the position is determined. In addition, the field device can also perform a determination of the position during each activation, i.e. in the present case upon each transition of the field device from a power-saving, sleep, or standby mode into an active or measuring mode.

After determining the position and/or the position signal indicating a position, an operating mode valid for the respective position is determined and set.

For example, a list of operating modes to be used for certain geographical locations can be obtained from a memory of the field device or the expansion module. The list could also be retrieved from the cloud.

To determine the position, position signals determined by means of a satellite network can be used, for example. Possible satellite networks were named as examples above.

Additionally or alternatively, information from available radio communication networks can be used in order to determine the position.

If a movement of the field device is detected and a position is determined only after switching on or upon activation after a detected movement, and if the previously used operating mode of the radio communication means is otherwise used further, a significant reduction of the required energy can be achieved.

According to the invention, a computer program code, which is executed by a processor, also causes a field device to carry out the method described above.

Preferred embodiments, features, and characteristics of the proposed field device correspond to those of the proposed method and vice versa.

Advantageous configurations and variants of the invention emerge from the following description.

DETAILED DESCRIPTION OF THE FIGURES

FIG. 1 shows a schematic view of a field device 1 according to the present application.

The field device 1 is only shown schematically in FIG. 1 and essentially comprises a sensor 7 for determining a measured value, e.g. a fill level, a control and evaluation unit 11, as well as a radio communication means 3 designed in order to transmit the measured value and any other data to a superordinate unit. In the present exemplary embodiment, the radio communication means 3 is configured as a LoRa radio module and is coupled to a broadband antenna 9, which is suitable for different frequency bands.

Furthermore, the field device 1 has a position determination means 5 configured as a GPS receiver, which is coupled to the control and evaluation unit 11 and the radio communication means 3.

The position determination means 5 is designed in order to determine a geographical position of the field device 1 on request of the control and evaluation unit 11 and to provide position information.

Based on the position information provided, the control and evaluation unit 11 determines, by means of a Channel Plan stored in a memory 13 of the control and evaluation unit 11, the operating mode of the radio communication means 3 [from] an allocation of geographical positions and combinations of the number of channels to be used that are permissible and prescribed at the geographical positions (frequency and bandwidth), duty cycles, maximum payload and transmission power.

The activation of broadband antenna 9 is adjusted accordingly for the different frequencies.

Figure 2:
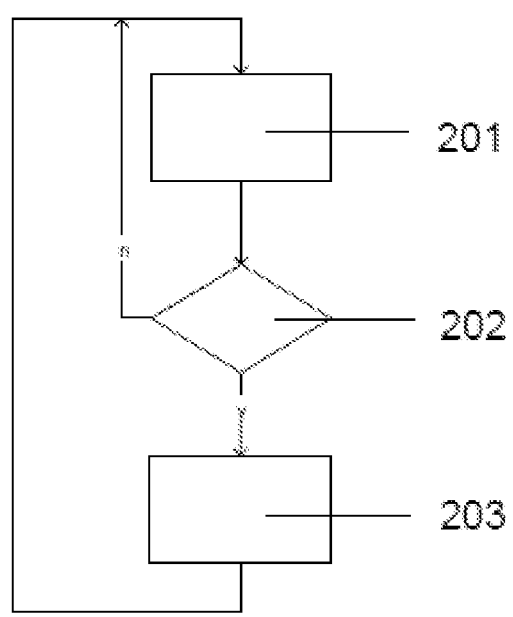
FIG. 2 is a schematic view showing an exemplary workflow for operating the field device according to FIG. 1.

FIG. 2 shows an exemplary workflow as it can be used to operate a field device 1, as shown in FIG. 1. Only the steps relevant with regard to the position determination and position-dependent setting of the radio communication means 3 are described. The determination of measured values by means of the sensor 7, the processing of the measured values, and their transmission via the radio communication means 3 to a superordinate unit, for example a control room or a server in a data cloud, does not differ from the methods known from the prior art. For reasons of energy saving, individual process steps can be carried out on an as-needed or timer-controlled basis. For example, a current position determination is only necessary if communication is actually to take place via the radio communication means 3 and/or if the field device 1 has moved beforehand, i.e. the position of the field device 1 has probably changed.

In the simplified method shown in FIG. 2, a location determination is carried out in a first step 201.

In a second step 202, it is determined whether the position of the field device 1 has changed relative to the position last determined and whether the new position is to be allocated to a new region, i.e. a region in which the radio communication means 3 must be operated in another operating mode, e.g. Channel Plan.

If the region of the field device 1 has not changed, then the radio communication means 3 is reused with the previously used settings and the method is restarted with step 201 before a new use.

If the position has changed in such a way that the field device 1 is located in a new region, i.e. in a region in which it must be operated with a different operating mode, then the changed operating mode is set in a third step 203 and the radio communication means 3 is operated in the changed operating mode.

In an alternative embodiment of the method, the movement of the field device 1 is monitored by an acceleration sensor, for example. In order to save energy for unnecessary position determinations, a position determination according to step 201 is only carried out if a movement of the field device 1 was previously detected.

Figure 3:
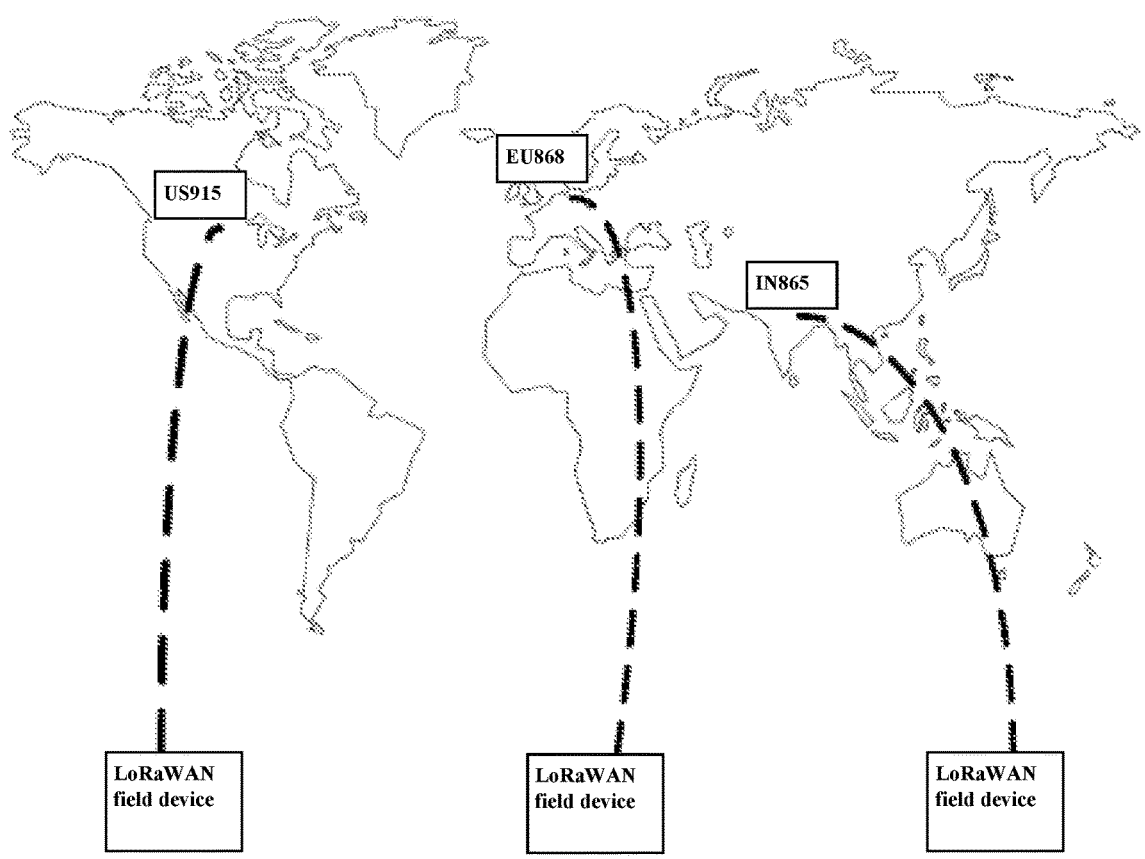
FIG. 3 is a world map with regions for the LoRa network drawn in as examples.

FIG. 3 shows an example of a world map with regions for the LoRa network change drawn in as an example, in which the prescribed operating mode[s] of the radio communication unit 3 differ from one another. The world map given here shows the assignment of regional parameter sets according to the publication RP002-1.0.1 LoRaWAN Regional Parameters of LoRa Alliance, Inc. (as of Feb. 20, 2020), according to which the parameter set US915 is to be used in the United States, the parameter set EU868 is to be used in Europe, and IN865 is to be used in India.

A field device, as described with reference to FIG. 1, can automatically determine and apply the respective parameter sets to be used as a function of its geographical position.

Some significant differences between the Channel Plans for the European Union (EU 868) and North America (US 915) are given below.

| Channel Plan | EU 868 | US 915 |
|---|---|---|
| Channel Frequency | 867-86 MHz | 902-928 MHz |
| Number of Channels | 10 | 64 + 8 + 8 |
| Channel BW Up | 125/250 kHZ | 125/500 kHz |
| Channel BW Dn | 125 kHZ | 500 kHz |
| TX Power Dn | +14 dBm | +27 dBm |
| Tx Power Up | +14 dBm | +20 dBm typ (+30 dBm allowed) |
| Data rate | 250 bps-50 kbps | 980 bps-21.9 kpbs |

LIST OF REFERENCE NUMBERS

1 Field device
3 Radio communication means
5 Position determination means
7 Sensor
9 Antenna
11 Control and evaluation unit
13 Memory
201-203 Method steps Unless indicated otherwise, identical reference numbers in the figures identify identical components with the same function. The terms drive unit and drive are used interchangeably herein.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A field device having at least one radio communication means with at least two different operating modes, wherein the different operating modes can be activated as a function of the operating location of the field device, wherein the field device has at least one position determination means, wherein the field device is configured in order to determine a country-specific operating mode of the radio communication means from the position data and to make a selection according to predetermined conditions.

2. The field device of claim 1, wherein the position determination means is configured as a satellite-supported position determination means.

3. The field device of claim 1, wherein the position determination means is designed in order to evaluate position data provided by a wireless network.

4. The field device of claim 1, wherein the operating mode comprises a channel selection and/or a used frequency band and/or a setting of a transmission power and/or a setting of a radio protocol.

5. The field device of claim 1, wherein the field device is configured in order to detect a movement of the field device.

6. The field device of claim 1, wherein the field device is configured as an autonomous field device.

7. An expansion module for a field device, wherein the expansion module has at least one radio communication means with at least two different operating modes, wherein the different operating modes are dependent on an operating location of the field device, wherein the expansion module has at least one position determination means, wherein the expansion module is configured in order to determine a country-specific operating mode of the radio communication means from the position data and to make a selection according to predetermined conditions.

8. A transportable container having a field device, wherein the field device of claim 1 is configured as a field device with an expansion module, wherein the expansion module has at least one radio communication means with at least two different operating modes, wherein the different operating modes are dependent on an operating location of the field device, wherein the expansion module has at least one position determination means, wherein the expansion module is configured in order to determine a country-specific operating mode of the radio communication means from the position data and to make a selection according to predetermined conditions.

9. A method for operating the field device of claim 1, comprising the following steps:
determining a position and/or a position signal indicating a position,
determining a country-specific operating mode applicable to the position
setting the operating mode,
operating the radio communication means in the set operating mode.

10. The method of claim 9, wherein position signals of a satellite network are determined for the position determination.

11. The method of claim 9, wherein information of available radio communication networks is determined for the position determination.

12. The method of claim 9, wherein a movement of the field device is detected and a position determination is performed only upon switching on or activation after a detected movement, and otherwise the previously used operating mode of the radio communication means is used further.

13. A computer program code, which, when executed by a processor, causes a field device to carry out the method according to any of the claim 9.

14. A method for operating the transportable container having a field device of claim 8, comprising the following steps:
determining a position and/or a position signal indicating a position,
determining a country-specific operating mode applicable to the position
setting the operating mode,
operating the radio communication means in the set operating mode.

* * * * *